Patented Mar. 11, 1952

UNITED STATES PATENT OFFICE 2,588,391

2,588,391
16-ALKYL STEROIDS AND PROCESS OF PREPARING

Percy L. Julian, Maywood, and Edwin W. Meyer and Helen Printy, Chicago, Ill., assignors to The Glidden Company, Cleveland, Ohio, a corporation of Ohio No Drawing. Application May 22, 1947, Serial No. 749,887

16 Claims. (Cl. 260—397.4)

This invention relates to 16-alkylated compounds of the androstene series, and particularly to 16-methyldehydroisoandrosterone, 16-methylenedehydroisoandrosterone and 16-methyltestosterone.

It has been fairly well established that testosterone is rather rapidly destroyed in the liver and its testiculoid activity on administration is, therefore, of relatively short duration. Various derivatives of testosterone have been suggested to sustain or prolong testiculoid activity. Among these are testosterone propionate and 17-methyltestosterone. The former, being an ester, probably undergoes hydrolysis slowly in the body and in this way the testosterone is more slowly released. 17-methyltestosterone, being normally foreign to the body, is supposedly more slowly metabolized.

It is conceivable that the presence of a methyl group in the 16-position might not only allow of maintenance of androgenic properties, but might sustain the testiculoid activity in an even more favorable manner than the above mentioned derivatives. The added hindrance of a methyl group in the 16-position might particularly favor slow saponification of a 17-ester in vivo.

In addition to the testiculoid activity these androgenic materials also frequently have other effects which may not be desirable. Thus 17-methyl testosterone has the effect of causing an undesirable enlargement of the prostate. An androgenic material which would possess these undesirable properties in a lesser degree would be highly useful.

It is accordingly an object of the present invention to provide new compounds of the androstene series.

It is a further object of the present invention to provide new derivatives of testosterone.

Another object is to provide new androgenic materials of improved properties.

An additional object is to provide a process for preparing the new compounds of the present invention.

Other objects will be apparent to those skilled in the art from the following description.

According to the present invention the Mannich bases of dehydroisoandrosterone are treated to split off an amine, with the formation of a 16-methylene derivative. This may preferably be accomplished by heating the 16-aminomethyl compounds in the presence of an acid anhydride or an alkali. Partial hydrogenation of the methylene derivative leads first to the 16-methyl compound, and more complete hydrogenation results in reduction of the 17-keto group to the alcohol. Esterification of the 17-OH group gives an ester linkage which is slow to hydrolyze, the 16-methyl group apparently increasing the steric hindrance. This may be an advantage where there is already an ester linkage at the 3-position since partial hydrolysis would lead to a good yield of the 3-hydroxy-17-acyl compounds. The 3-hydroxy-17-acyl compound may then be oxidized to the 3-keto-17-acyl compound. When desired the 3-keto-17-acyl compound may then be hydrolyzed to 16-methyl testosterone. These reactions may be represented by the following equations, where R is a hydrocarbon radical.

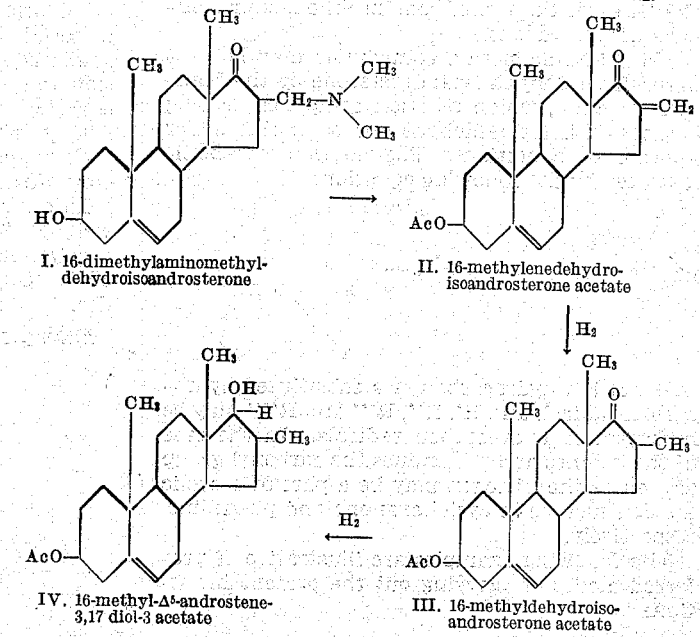

I. 16-dimethylaminomethyl-dehydroisoandrosterone

II. 16-methylenedehydro-isoandrosterone acetate

IV. 16-methyl-Δ⁵-androstene-3,17 diol-3 acetate

III. 16-methyldehydroiso-androsterone acetate

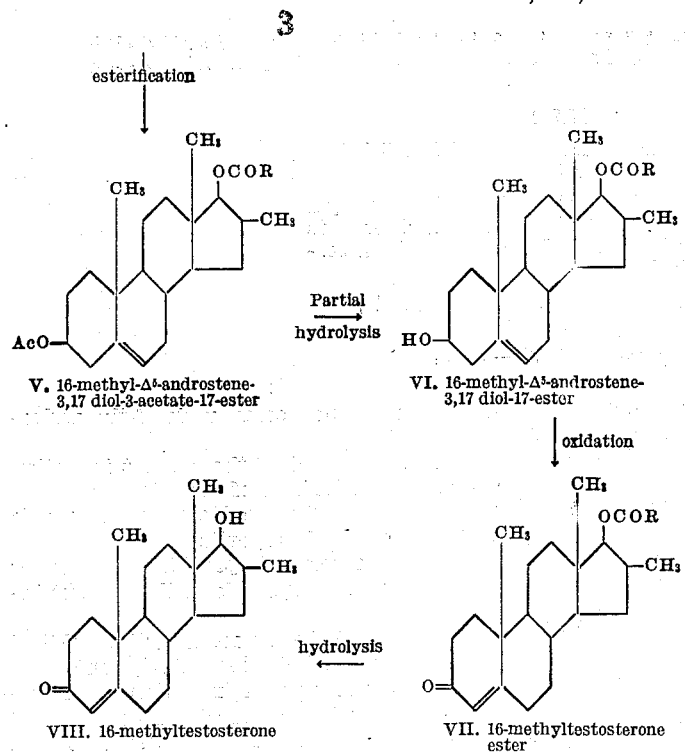

V. 16-methyl-Δ⁵-androstene-3,17 diol-3-acetate-17-ester

VI. 16-methyl-Δ⁵-androstene-3,17 diol-17-ester

VIII. 16-methyltestosterone

VII. 16-methyltestosterone ester

It is not essential that an esterifying agent be present during the splitting off of the amine. However, subsequent esterification of the 17-OH group results in esterification of an OH group in the 3-position. It would not be desirable to put a difficultly hydrolyzable group in both the 3 and 17 positions and, therefore, if such a group were used for 17-esterification, the preferred course would be to have an easily hydrolyzable group in the 3 position. For this reason it may be desirable to acylate in the 3 position prior to esterification of the 17-OH group. This makes the deamination procedure with an acylation mixture like acetic acid-acetic anhydride a preferred procedure in certain cases. This selective esterification may, of course, be effected at any time prior to the esterification of the 17-OH group. The 16-methylene derivative may also be prepared by removal of the elements of an aliphatic amine from the Mannich base of dehydroisoandrosterone through the use of sodium ethoxide or similar alkaline reagent.

The 16-aminomethyl compounds may be prepared from dehydroisoandrosterone by the Mannich reaction, which reaction comprises heating ketones with formaldehyde and an amine under appropriate conditions. The reaction may be illustrated by the following equation:

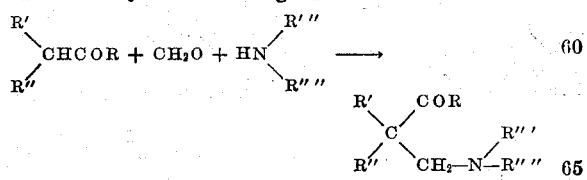

where R is a hydrocarbon or a substituted hydrocarbon radical, and R', R'', R''' and R'''' may be hydrogen or hydrocarbon radicals. In the case of the ketones and the amines the carbonyl group as well as the nitrogen may be a part of a cyclic system, such as in cyclohexanone and piperidine, respectively.

The following examples are illustrative of preferred modes of carrying out the present invention:

*Example I.—16-dimethylaminomethyldehydroisoandrosterone*

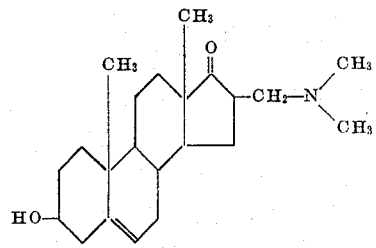

A mixture of 2.88 g. of dehydroisoandrosterone, 1.5 g. of paraformaldehyde and 5.0 g. of anhydrous dimethylamine hydrochloride in 25 cc. of isoamyl alcohol was refluxed for two hours. During this period a solid separated and frequent swirling was necessary to keep it suspended. After chilling overnight, the mixture was diluted with ether and extracted with dilute aqueous hydrochloric acid. There remained some insoluble material. This was separated and added to the acidic aqueous solution. The combined suspension was made alkaline with cold dilute sodium carbonate solution and exhaustively extracted with ether. After washing the ether solution with water to free it of alkali, it was dried and concentrated. From the concentrated ethereal solution a white solid crystallized. The solid weighed 2.5 g. and melted at 158–168° C., dec. Recrystallized from ether petroleum ether (B. P. 35–60° C.) gave needles melting at 173–174.5° C. dec.

*Example II.—16-methylenedehydroisoandrosterone acetate*

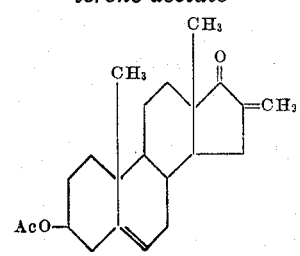

A solution of 10 g. of 16-dimethylaminomethyl-dehydroisoandrosterone in 25 cc. of acetic acid and 25 cc. of acetic anhydride was heated on the steam bath for two hours. The majority of the solvent was then removed in partial vacuum at steam bath temperature and water was added to the mush of solid material. The mixture was extracted with ether. The ethereal extract was washed with 10% aqueous sodium hydroxide solution followed by water. The dry solution was concentrated and the product crystallized by addition of petroleum ether (B. P. 35–60° C.). The petroleum ether was added as the ether was removed. There resulted 8.0 g. of white crystalline material melting at 160–165° C.

*Example III. — 16-methyldehydroisoandrosterone acetate*

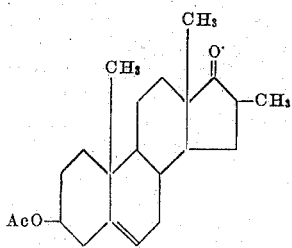

A solution of 2.5 g. of 16-methylenedehydroisoandrosterone acetate in 75 cc. of absolute ethanol was reduced in the presence of Raney nickel catalyst with hydrogen at one atmosphere pressure and 30° C. The reaction was stopped after one mole equivalent of the gas was absorbed. The catalyst was separated and the ethanol removed in vacuo. The crystalline, white solid residue was crystallized from ether-petroleum ether (B. P. 35–60° C.), 1.6 g., M. P. 137–143° C. Several recrystallizations from methanol gave the pure product, 16-methyldehydroisoandrosterone acetate, as heavy needles melting at 144–146° C.

This ketone formed a semicarbazone derivative melting at 243–245° C. with decomposition.

*Example IV.—16-methyl-5-androstene-3,17-diol-3-acetate-17-benzoate*

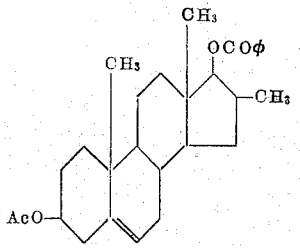

A solution of 3.4 g. of the methylene compound of Example II in purified ethanol (60 cc.) was reduced with fresh Raney nickel catalyst at 4 atmos. pressure and 25–30° C. The catalyst was separated and the solution combined with that of a similar hydrogenation of 3.4 g. of methylene compound. Ethanol was removed in partial vacuum at steam bath temperature. The last traces of ethanol were removed by addition of benzene and subsequent evacuation and heating. The remaining solid was dissolved in 60 cc. of pure, dry benzene to which 30 cc. of pyridine had been added. After the addition of 12 cc. of benzoyl chloride in 20 cc. of benzene, the mixture was allowed to stand overnight. It was then diluted with water and extracted with ether. The ethereal solution was washed with water, dilute hydrochloric acid followed by water. After removal of ether, the residue was steam distilled. The remaining material was taken up in ether and washed with dilute sodium hydroxide solution and water. Crystallization from methanol of the residue from the dried ethereal solution gave 4.0 g. of the acetate-benzoate melting at 135–147° C. Recrystallization from methanol gave glistening white plates melting at 148–151° C.

*Example V.—16-methyl-5-androstene-3,17-diol-3,17-diacetate*

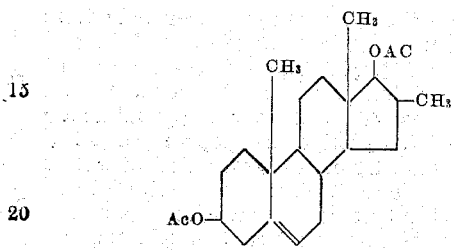

In a fashion similar to that of Example IV, the diacetate was prepared. In this instance after removal of solvent from the reduction solution, the residue was acetylated with acetic anhydride-acetic acid mixture. The diacetate when crystallized from petroleum ether (B. P. 35–60° C.) existed as white plates melting at 175–177.5° C.

*Example VI.—16-methyl-5-androstene-3,17-diol-17-benzoate*

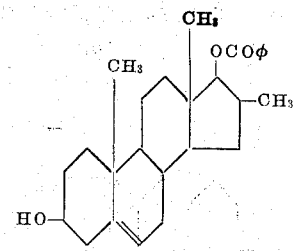

To a solution of 4.0 g. of the acetate-benzoate of Example IV in 200 cc. of methanol, there was added a solution of 0.8 g. of potassium hydroxide in 7.0 cc. of water and 33 cc. of methanol. The resulting solution was refluxed for 25 minutes and then concentrated in vacuo over a steam bath. The last of the concentration was accomplished with steam turned off. The concentration was continued until a goodly amount of crystalline solid had separated. This was filtered and washed with cold methanol—3.1 g. of glistening plates melting at 152–154° C.

*Example VII.—16-methyl-5-androstene-3,17-diol-17-acetate*

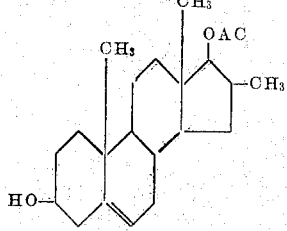

The diacetate of Example V was also hydrolyzed according to the directions of Example VI. There resulted the 17-acetate, glistening white plates, melting at 164.5–168.5° C.

Example VIII.—16-methyltestosterone benzoate

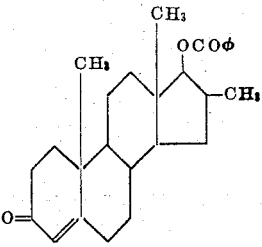

A solution of 3.0 g. of the monobenzoate from Example VI in 50 cc. of chloroform was brominated with 1.14 g. of bromine in 10 cc. chloroform. The solvent was removed in vacuo and the residue dissolved in 275 cc. of glacial acetic acid. An oxidizing mixture composed of 1.2 g. of chromic acid, 14 cc. of water and 35 cc. of acetic acid was added. The brown solution was allowed to stand at room temperature for two hours. After addition of 4 cc. 3 N sulfuric acid in 17 cc. of acetic acid and then 14 cc. of methanol (to decompose excess $CrO_3$), the solution was debrominated under $CO_2$ with 95 cc. of 1 molar chromous chloride solution in 90 cc. of acetic acid. The solution was allowed to stand overnight, concentrated in vacuo, diluted with water and extracted with ether. The extract was washed with water, dilute sodium hydroxide solution and water. It was dried and concentrated and the product crystallized from ether-petroleum ether (B. P. 35–60° C.). There resulted 2.0 g. of white prisms, M. P. 223–225.5° C.

Example IX.—16-methyltestosterone

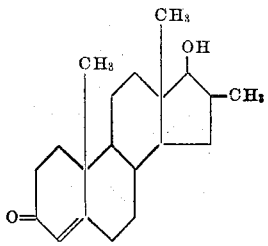

The keto-benzoate (1.5 g.) of Example VIII was hydrolyzed with 0.8 g. of potassium hydroxide in 5 cc. water and 50 cc. of methanol by refluxing eleven hours. After dilution with water the product was extracted with ether. From the washed and dried ether solution, the crude methyltestosterone was separated by concentration and chilling. It melted at 175–182° C. Recrystallization from acetone gave prisms melting at 182–185° C.

Example X.—16-methyltestosterone acetate

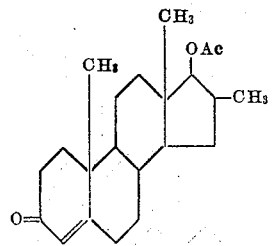

A solution of 6.92 g. of 16-methyl-5-androstene-3,17-diol-17-acetate in 75 cc. of methylenedichloride was brominated in the cold with 3.2 g. of bromine in 25 cc. of methylene dichloride. The solvent was removed in vacuo and the white, solid residue dissolved in 500 cc. of glacial acetic acid. After adding a solution of 3.5 g. of chromic acid in 30 cc. of water and 50 cc. of glacial acetic acid, the mixture was allowed to stand at room temperature for two and one-half hours. The excess oxidizing agent was then destroyed by the addition of 10 cc. 3 N sulfuric acid, 30 cc. of glacial acetic acid and 30 cc. of methanol. The green solution was then debrominated under $CO_2$ with 160 cc. of 1 molar chromous chloride solution in 160 cc. of glacial acetic acid. After three hours, the solution was concentrated, diluted with water and extracted with ether. The ether solution was washed with water, dilute sodium hydroxide solution and water. After removal of ether, the product was crystallized from ether-petroleum ether. The 16-methyltestosterone acetate formed prisms melting at 154–161° C.

It is to be understood that the foregoing examples are merely illustrative and that various modifications may be made therein without departing from the invention. Thus any Mannich base of dehydroisoandrosterone may be used as starting material. The dimethylamino-methyl compound is to be preferred in most cases where it is to be made as a starting material for the present invention since the yields are good. However, other Mannich bases may be used such as those of diethylamino, piperidine, etc. The procedures for making the Mannich bases, such as is illustrated by Example I, may be used for preparing the starting materials of the present invention.

Also other esters than those illustrated in the examples may be prepared. As indicated above, however, it is generally preferred to have an ester group in the 17 position which is more difficultly hydrolyzed than the one in the 3 position. This is not essential, however, as is shown by Example VII. In certain cases it may be desirable to have a different ester group in the 16-methyltestosterone ester than was used in the preparation. In such cases the original ester may be hydrolyzed and the resulting 16-methyltestosterone re-esterified with the desired esterifying agent. Other known means may be employed for oxidizing the 3—OH group to the keto group.

Reference is made to our co-pending application, Serial No. 747,886, filed concurrently herewith, now Patent No. 2,562,194.

Having described the invention, what is claimed is:

1. The process which comprises removing the elements of an aliphatic amine from a Mannich base of dehydroisoandrosterone to form a 16-methylene derivative of dehydroisoandrosterone, and hydrogenating said 16-methylene derivative using a Raney nickel catalyst.

2. The process of claim 1 in which 1 mole of hydrogen is added to each mole of the 16-methylene derivative.

3. The process of claim 1 in which 2 moles of hydrogen are added to each mole of the 16-methylene compound.

4. The process of claim 1 in which the removal of the elements of an aliphatic amine is carried out by heating in a mixture of glacial acetic acid and acetic anhydride.

5. The process which comprises removing the elements of an aliphatic amine from a Mannich base of dehydroisoandrosterone to form a 16-methylene derivative of dehydroisoandrosterone, hydrogenating said 16-methylene derivative with 2 moles of hydrogen for each mole of the 16-methylene derivative using a Raney nickel catalyst, forming a di-ester of the hydrogenated compound, partially hydrolyzing the di-ester to free the 3—OH group, and oxidizing the 3—OH group to a keto group.

6. The process which comprises removing the elements of an aliphatic amine from a Mannich base of dehydroisoandrosterone to form a 16-methylene derivative of dehydroisoandrosterone, hydrogenating said 16-methylene derivative with 2 moles of hydrogen for each mole of the 16-methylene derivative using a Raney nickel catalyst, forming a di-ester of the hydrogenated compound, partially hydrolyzing the di-ester to free the 3—OH group, oxidizing the 3—OH group to a keto group and hydrolyzing the resulting keto-ester to form 16-methyl testosterone.

7. The process which comprises removing the elements of an aliphatic amine from a Mannich base of dehydroisoandrosterone by heating in a mixture of glacial acetic acid and acetic anhydride to form a 16-methylene derivative of dehydroisoandrosterone.

8. The process which comprises heating 16-dimethylaminomethyldehydroisoandrosterone in a mixture of glacial acetic acid and acetic anhydride, hydrogenating the resulting 16-methylene-dehydroisoandrosterone acetate to 16-methyl-$\Delta^5$-androsten-3,17-diol-3-acetate, esterifying the 17 hydroxyl group, partially hydrolyzing the resulting di-ester to the 3-hydroxy compound, and oxidizing the 3—OH group thus formed to a keto group.

9. The process of claim 8 in which the remaining ester linkage in the 17-position of the 3-keto compound is hydrolyzed to form 16-methyl-testosterone.

10. Derivatives of dehydroisoandrosterone acetate having as a sole substituent on the dehydroisoandrosterone nucleus a hydrocarbon radical attached to the 16-carbon atom of the nucleus, said hydrocarbon radical consisting of a single carbon atom bonded only to the 16-carbon atom of the nucleus and to hydrogen.

11. 16-methyl androstene compounds having in the 17-position an RCOO— group in which R is a hydrocarbon radical of less than 7 carbon atoms and in which the double bond of the androstene nucleus involves the number 5 carbon atom, said compounds being further characterized in that there is an oxygen containing radical molecular weight which is less than 18 attached through the oxygen thereof to the number 3 carbon atom of the androstene nucleus.

12. 16-methyl-$\Delta^5$-androstene compounds having in the 3-position an RCOO— group in which R is a hydrocarbon radical of less than 7 carbon atoms, said compounds being further characterized in that there is an oxygen containing radical the molecular weight of which is less than 18 attached through the oxygen thereof to the number 17 carbon atom of nucleus.

13. 16-methyl testosterone.

14. Compounds of the general formula

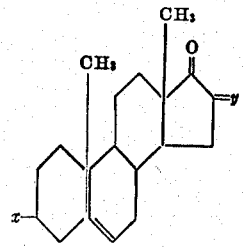

wherein $x$ is selected from the group consisting of —OH and RCOO— wherein R is a hydrocarbon radical of less than 7 carbon atoms, and $=y$ is selected from the group consisting of

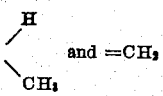

15. Compounds of the general formula

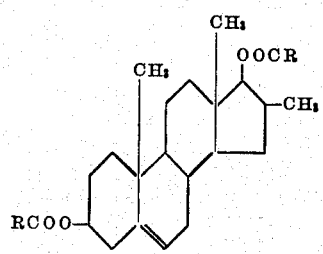

wherein R is a hydrocarbon radical of less than 7 carbon atoms.

16. 16-methyl-5-androstendiol-3,17.

PERCY L. JULIAN.
EDWIN W. MEYER.
HELEN PRINTY.

REFERENCES CITED

The following references are of record in the file of this patent:

UNITED STATES PATENTS

| Number | Name | Date |
| --- | --- | --- |
| 2,109,400 | Miescher | Feb. 22, 1938 |

OTHER REFERENCES

Stodola: Jour. Organic Chemistry, 6, 837–840 (1941).

Stodola: Jour. Organic Chemistry, 7, 336–340 (1942).

Adams' Organic Reactions, vol. I, 318–319 (1942).